United States Patent
Liu

(10) Patent No.: US 8,488,584 B2
(45) Date of Patent: Jul. 16, 2013

(54) METHOD AND APPARATUS FOR EFFICIENT DATA BROADCAST WITHIN BEACONING NETWORK

(75) Inventor: Yung-Chih Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 1871 days.

(21) Appl. No.: 11/366,057

(22) Filed: Mar. 2, 2006

(65) Prior Publication Data

US 2007/0115903 A1 May 24, 2007

(30) Foreign Application Priority Data

Nov. 23, 2005 (TW) .............................. 94141150 A

(51) Int. Cl.
*H04J 3/06* (2006.01)
*H04W 4/00* (2009.01)
*H04B 7/00* (2006.01)

(52) U.S. Cl.
USPC ........................... 370/350; 370/338; 455/41.2

(58) Field of Classification Search
USPC ........................................................ 370/350
See application file for complete search history.

(56) References Cited

U.S. PATENT DOCUMENTS

| | | | |
|---|---|---|---|
| 6,272,117 B1 * | 8/2001 | Choi et al. | 370/330 |
| 6,473,399 B1 * | 10/2002 | Johansson et al. | 370/229 |
| 2002/0068588 A1 | 6/2002 | Yoshida et al. | |
| 2003/0181165 A1 | 9/2003 | Sugar et al. | |
| 2004/0203460 A1 | 10/2004 | Hasegawa | |
| 2004/0240411 A1 * | 12/2004 | Suzuki | 370/331 |
| 2005/0085264 A1 | 4/2005 | Matsumura | |
| 2005/0122220 A1 * | 6/2005 | Staples | 340/569 |
| 2006/0187877 A1 | 8/2006 | Lundby et al. | |

FOREIGN PATENT DOCUMENTS

| | | |
|---|---|---|
| EP | 1 211 839 A2 | 6/2002 |
| WO | WO 02/058334 A2 | 7/2002 |
| WO | WO 03/028302 A2 | 4/2003 |

\* cited by examiner

*Primary Examiner* — Huy C Ho
(74) *Attorney, Agent, or Firm* — Patterson Thuente Pedersen, P.A.

(57) ABSTRACT

A wireless communication apparatus, system, method and computer readable medium therefor for transmission between a parent node and a child node are provided. The child node transmits a first packet to the parent node via point-to-point transmission. When the parent node tries to transmit a second packet to the child node, a synchronization signal is transmitted first and then the second packet is transmitted to the child node via broadcast transmission after a certain period. If the child node fails to receive the second packet during the certain period, the child node sends a signal to the parent node. The parent node re-transmits the second packet to the child node via point-to-point transmission.

20 Claims, 9 Drawing Sheets

METHOD AND APPARATUS FOR EFFICIENT DATA BROADCAST WITHIN BEACONING NETWORK

CROSS-REFERENCES TO RELATED APPLICATIONS

This application claims priority to Taiwan Patent Application No. 094141150 filed on Nov. 23, 2005.

STATEMENT REGARDING FEDERALLY SPONSORED RESEARCH OR DEVELOPMENT

Not applicable

BACKGROUND OF THE INVENTION

1. Field of the Invention

The present invention relates to a wireless communication system, a wireless communication device, a wireless communication method and a computer-readable medium therefore for packet transmission. More specifically, the present invention relates to a wireless communication system, a wireless communication device, a wireless communication method and a computer-readable medium therefore for defining packet transmission rules between nodes.

2. Descriptions of the Related Art

Low speed wireless communication devices are highly noticed recently in the fields of household appliances, toys, industries, security services, and medical care. For the characteristics of low cost, low power consumption, and easily disposed, it is especially proper to be applied in low maintenance and broad service area. Among various low speed wireless communication protocols, the most representative standard is IEEE 802.15.4/ZigBee.

Whereas most wireless communication devices are restricted by radio wave strength, the coverage is limited. When a large service area is desired, access points are usually needed to dispose a union of radio wave coverage. As shown in FIG. 1, when information is transmitted from a node 11 to a node 13 and radio wave coverage 11A of the node 11 does not cover the node 13, thus, the information is transmitted to an access point 12 first, and then, the access point 12 passes the information to the node 13 by way of the radio wave coverage 12A of the access point 12. In this kind of network, choosing different routing and various controls thereof should be achieved by broadcasting data packets.

Owing to the broadcast in a large-scale wireless network should be made by relay of a plurality of nodes, the nodes, used for transmitting broadcast packets, must assure that all of the connecting nodes could receive packets accurately to ensure the broadcasting packet could be transmitted to every node in the whole service area. However, there is no "acknowledging packet" in the manner of broadcasting. Accordingly, the transmitting node is unable to comprehend whether the packet is received by the receiving node accurately. Under the current skills, multiple unicasting or monitoring whether the connecting nodes relay the packet are used to judge if a packet requires being re-transmitted or not.

The prior art of the above-mentioned will result in problems shown as the following. The nodes would not receive packets accurately when they are in a doze mode. Consequently, the hidden terminal problem would cause collisions and lead to misjudgments. Thereafter, a large number of packet re-transmissions, excessively long delayed time, and waste of operations on a single node are generated.

According to the above descriptions, a wireless communication system and method that could deal with packets and save bandwidth are badly needed in the industrial field.

SUMMARY OF THE INVENTION

The primary object of this invention is to provide a wireless communication system comprising a child node and a parent node. When a first packet is transmitted from the child node to the parent node, the child node transmits the first packet to the parent node by way of point-to-point transmission. When a second packet is transmitted from the parent node to the child node, the parent node first transmits a synchronization signal with a specified flag set to one to the child node. Upon the synchronization signal is received by the child node, the specified flag will be recognized and the child node will be ready to receive the second packet, transmitted by way of broadcasting, from the parent node in response to the synchronization signal.

Another object of this invention is to provide a communication device for wireless communicating with a parent node and a child node. When a first packet is transmitted from the communication device to the parent node, the communication device transmits the first packet to the parent node by way of point-to-point transmission. When a second packet is transmitted from the communication device to the child node, the communication device transmits a first synchronization signal with a specified flag set to one, and transmits the second packet to the child node within a certain period by way of broadcasting.

Still another object of this invention is to provide a wireless communication method between a child node and a parent node. The wireless communication method comprises the following steps of: transmitting a first packet from the child node to the parent node by way of point-to-point transmission when the first packet needs to be transmitted to the parent node; transmitting a synchronization signal with a specified flag set to one from the parent node to the child node when a second packet needs to be transmitted to the child node; and receiving the second packet, transmitted by way of broadcasting, by the child node in response to the synchronization signal.

Yet a further object of this invention is to provide a computer-readable medium storing a computer program to perform the previously described method.

The present invention could lighten the problem of packet collision, and use the network bandwidth effectively. It could also shorten the delayed time on broadcasting packets.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
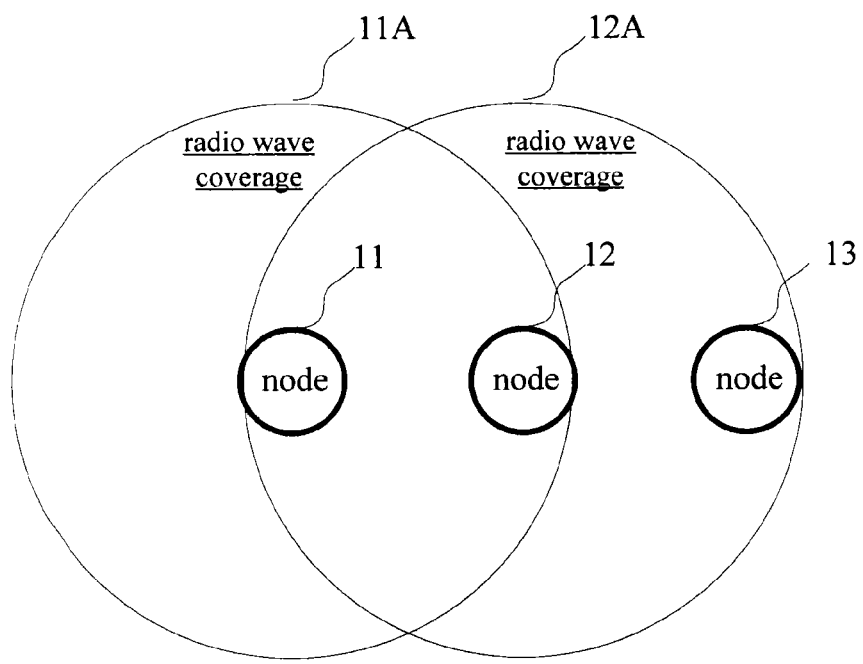
FIG. 1 illustrates the coverage of nodes and radio waves in a wireless network.
Figure 2:
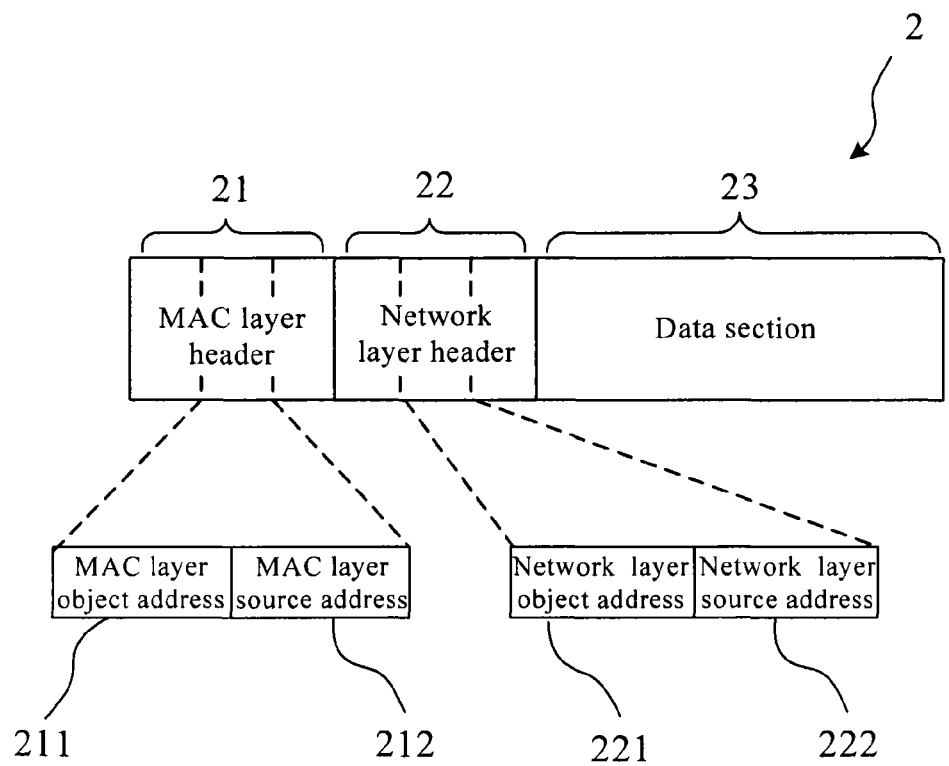
FIG. 2 illustrates a diagram of a data packet structure in a wireless network.

FIG. 2 illustrates a diagram of a packet structure in a wireless network. The packet 2 comprises a MAC (medium access control) layer header 21, a network layer header 22, and a data section 23. The MAC layer header 21 stores a MAC layer object address 211 and a MAC layer source address 212 which are mainly used for determining addresses of object nodes and source nodes in data transmission. The network layer header 22 stores a network layer object address 221 and a network layer source address 222 which are mainly used for providing information of network structure, controlling, packet routing, and etc. The present invention adopts the manner of determining the address of the network layer and replacing the source address and object address of the MAC layer for routing and relaying.

Figure 3:
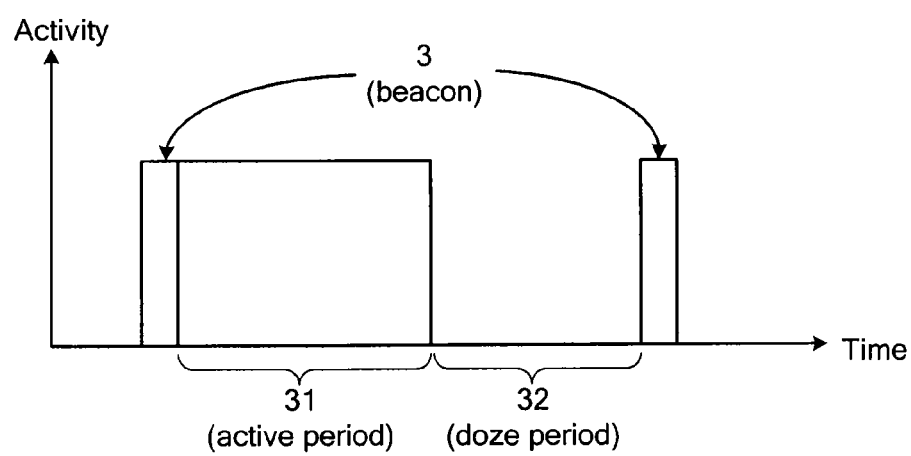
FIG. 3 illustrates a timing diagram of packet transmission.

FIG. 3 illustrates a timing diagram of packet transmission. In conventional wireless network communicating protocol, a node periodically transmits a beacon 3 for connection maintenance and synchronous control. In the present invention, the broadcasting packets are transmitted in an active period 31 during a certain period after a synchronization signal. The broadcasting transmission is determined by a reserved bit within the beacon 3. When a broadcasting packet needs to be transmitted in the active period 31, the reserved bit is set as "1". The node, which receives the beacon 3, would stop all the packet transmissions after the active period 31 begins, and waits the broadcasting packet for avoiding collision. The longest waiting period for the broadcasting packet is twice as long as a time requirement for receiving a probably longest packet. If the beacon 3 does not hold a reserved bit, the node could ignore the broadcasting packet and receive and transmit packets according to the normal process. Basically, data is neither transmitted nor received in the doze period 32, which is the time out of the active period 31. The nodes go into the doze mode during the doze period 32 for economizing power consumption.

In the present invention, if a packet is transmitted to all nodes in the whole network, it is the most direct manner of network topology along with parent-child nodes that relays node by node. In a hierarchical tree topological structure, each node has only one parent node. Thus, the packets transmitted to the parent node could be transmitted by way of point-to-point transmission. On other hand, each node has a plurality of child nodes. Thus, the manner of transmitting the packets to the child nodes is better to transmit them by way of broadcasting.

Figure 4:
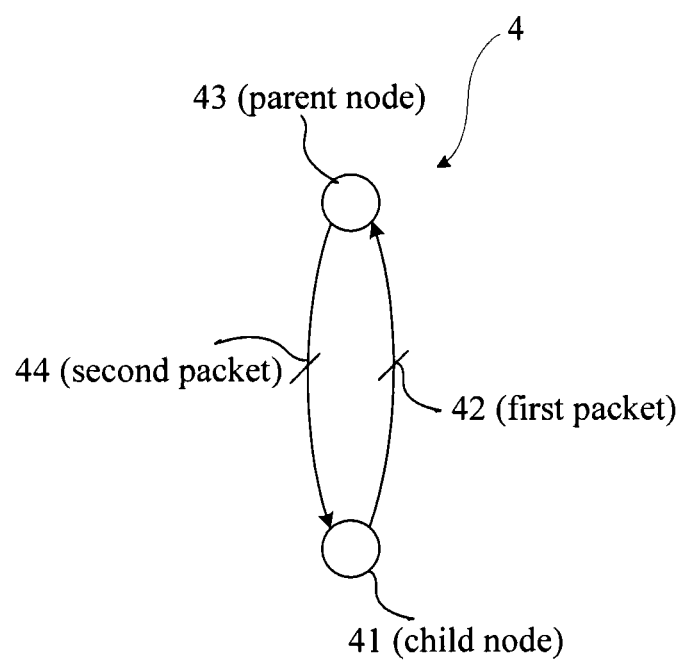
FIG. 4 illustrates a diagram of the transmission between nodes of the present invention.

The first embodiment of the present invention shown in FIG. 4 is a wireless communication system 4, which comprises a child node 41 and a parent node 43. When a first packet 42 is transmitted from the child node 41 to the parent node 43, the child node 41 transmits the first packet 42 to the parent node 43 by way of point-to-point transmission. When a second packet 44 is transmitted from the parent node 43 to the child node 41, the parent node 43 transmits a synchronization signal with a specified flag set to one and the child node receives the second packet 44, which is transmitted by way of broadcasting, from the parent node 43 in response to the synchronization signal.

Figure 5:
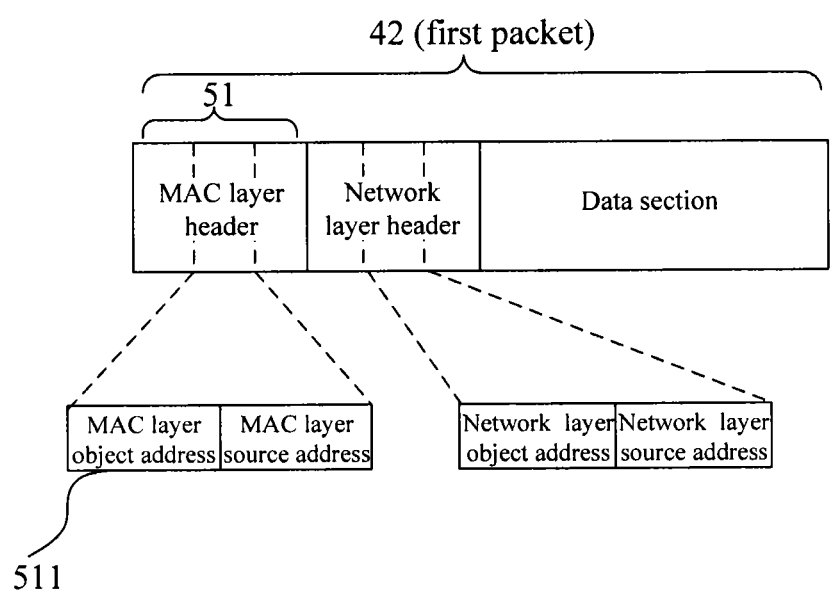
FIG. 5 illustrates a diagram of a first packet.
Figure 6:
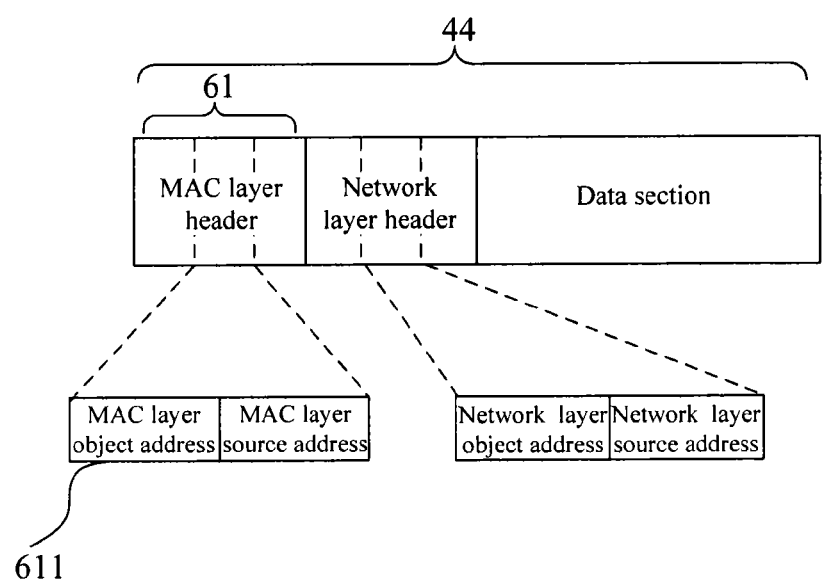
FIG. 6 illustrates a diagram of a second packet.

FIG. 5 illustrates a diagram of the first packet 42 and FIG. 6 illustrates a diagram of the second packet 44. The first packet 42 comprises a first MAC (medium access control) layer header 51. When a first packet 42 is transmitted from the child node 41 to the parent node 43, the child node 41 sets an object address 511 of the first MAC layer header 51 as an address of the parent node 43. The second packet 44 comprises a second MAC (medium access control) layer header 61. When a second packet 44 is transmitted from the parent node 43 to the child node 41, the parent node 43 sets an object address 611 of the second MAC layer header 61 as a broadcasting address, whereby all child nodes 41 (only one child node 41 is illustrated in FIG. 4) of the parent node 43 could receive the second packet 44.

After the child node 41 receives the synchronization signal, it would reserve a packet receiving period for receiving the second packet 44 from the parent node 43 by way of broadcasting. The better packet receiving period is twice as long as a time requirement for the child node 41 receiving a probably longest packet to ensure that does not miss the second packet 44. If the child node 41 fails to receive the second packet 44 in a certain period (the packet receiving period for example) after receiving the synchronization signal, the child node 41 sends a request signal to the parent node 43 for re-transmitting the second packet 44. The parent node 43 re-transmits the second packet 44 to the specific child node 41 by way of point-to-point transmission in response to the request signal.

Figure 7:
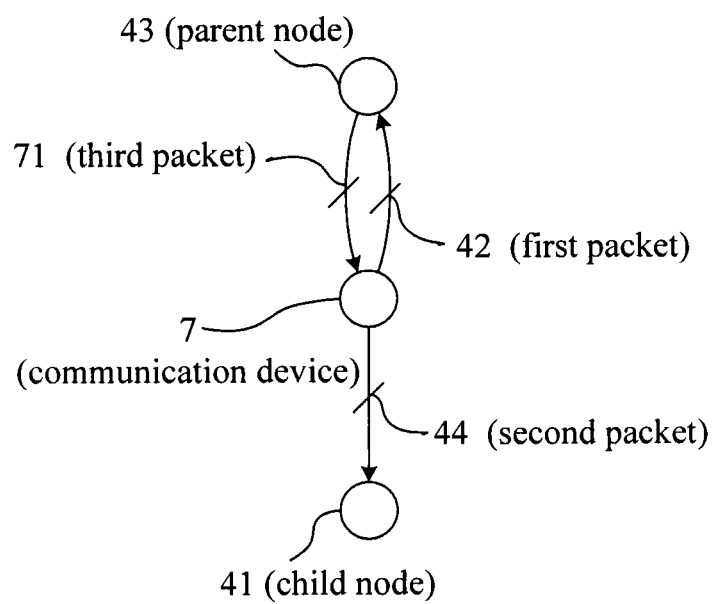
FIG. 7 illustrates a communication device for wireless communicating with a parent node and a child node.

In the system, each node could possibly be a parent node or a child node for other nodes. The second embodiment, as shown in FIG. 7, is a communication device 7 for wireless communicating with a parent node 43 and a child node 41 wherein the communication device 7 is also a node. When a first packet 42 is transmitted from the communication device 7 to the parent node 43, the communication device 7 transmits the first packet 42 to the parent node 43 by way of point-to-point transmission. When a second packet 44 is transmitted from the communication device 7 to the child node 41, the communication device 7 transmits a first synchronization signal with a specified flag set to one, and transmits the second packet 44 to the child node 41 after a certain period by way of broadcasting.

The communication device 7 reserves a packet receiving period for receiving a third packet 71 as the communication device 7 receives a second synchronization signal with a specified flag set to one transmitted from the parent node 43. The communication device 7 sends a first request signal to the parent node 43 for re-transmitting the third packet 71 as the communication device fails to receive the third packet 71 in a certain period after receiving the second synchronization signal The manners of packet transmission disclosed in the first embodiment are also applicable in the second embodiment, and therefore it is not necessary to be restated.

Figure 8:
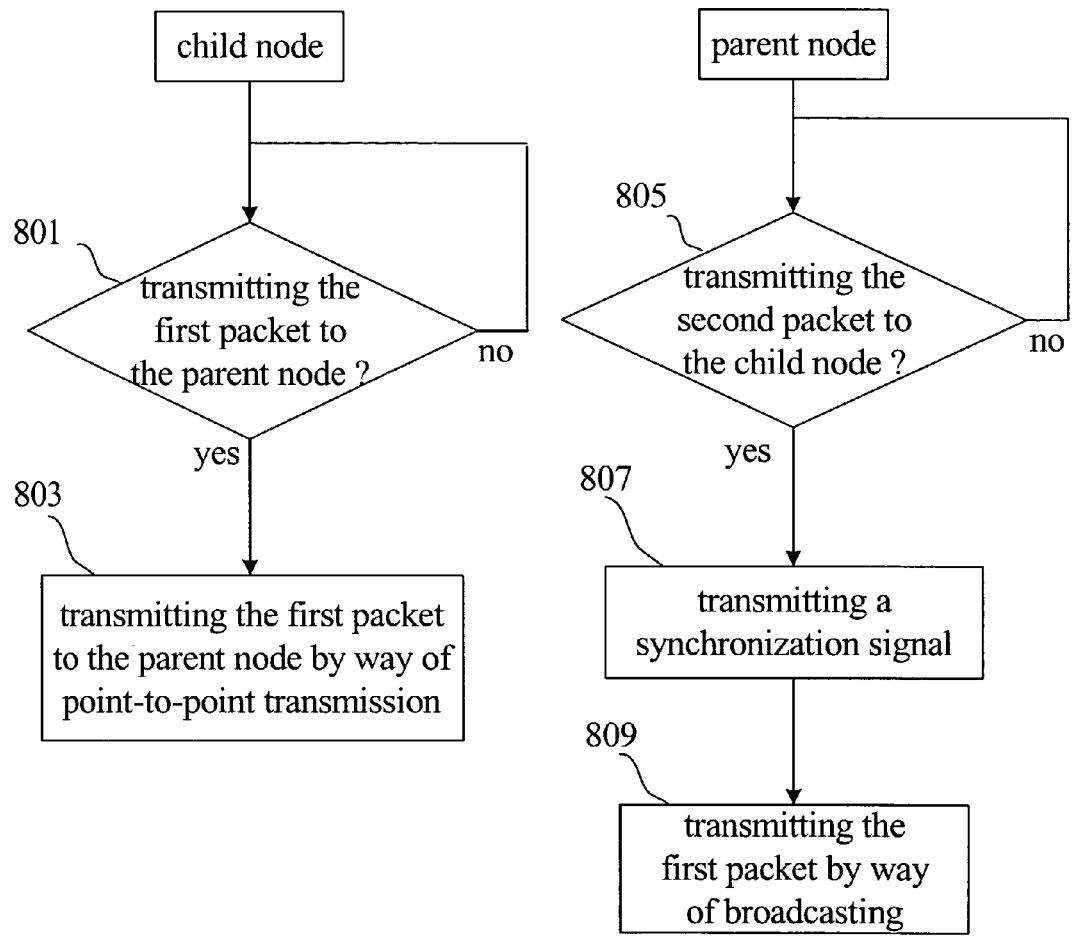
FIG. 8 illustrates a flow chart of the wireless communication method of the present invention.

The third embodiment of the present invention, collocating with the foregoing figures and the disclosed system or device, is a wireless communication method between a child node and a parent node. The method is shown in FIG. 8. In step 801, the child node determines whether a first packet needs to be transmitted to the parent node. If yes, execute step 803 that the child node transmits the first packet to the parent node by way of point-to-point transmission. If no, go back to step 801 that re-determines whether a packet needs to be transmitted to the parent node after a period of time. In step 805, the parent node determines whether a second packet needs to be transmitted to the child node. If yes, execute step 807 that the parent node transmits a synchronization signal with a specified flag set to one. Then, execute step 809 that the parent node transmits the second packet to the child node by way of broadcasting.

The present invention also comprises a computer-readable medium, storing a computer program to perform said method. The computer-readable medium could be floppy disks, hard disks, CD-ROMs, portable storing devices, magnetic tapes, accessible database via network or any other storage media possessing the same functions that people skilled in the art could easily think of.

Figure 9:
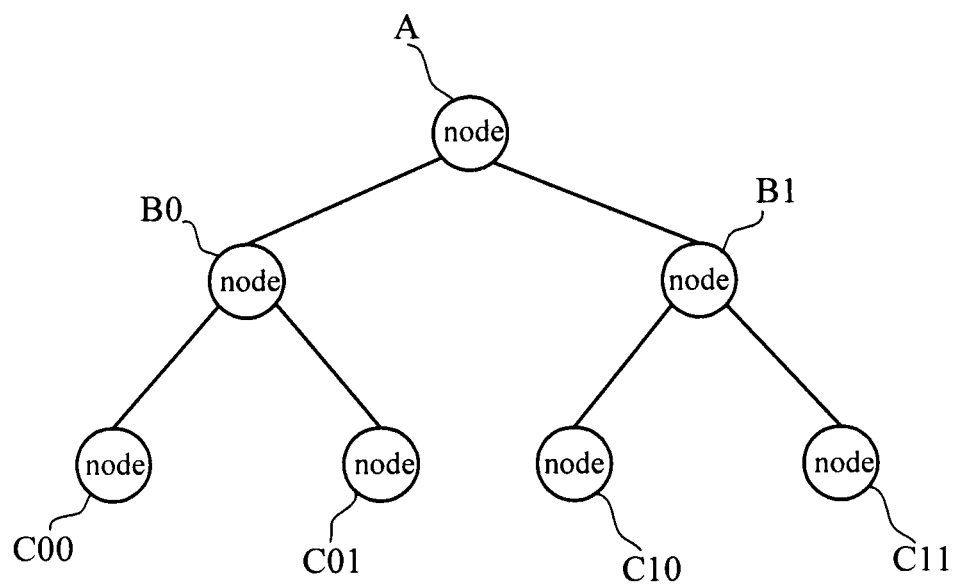
FIG. 9 illustrates a wireless network applying the present invention.

FIG. 9 illustrates the fourth embodiment of the present invention, which is a wireless network comprising 7 nodes. In the embodiment, node A transmits a packet to child nodes B0 and B1 by way of broadcasting. After node B0 receives the packet, it transmits the packet to other child nodes C00 and C01 by way of broadcasting. Similarly, after node B1 receives the packet transmitted from node A, it transmits the packet to other child nodes C10 and C11 by way of broadcasting.

For proving the effects of the present invention, a simulation test regarding the fourth embodiment is performed. The environmental conditions are recited as follows. 7 nodes disposed as a tree structure. Each node could only receive the packets transmitted from parent nodes or child nodes thereof. The whole network is a multi-hop beacon enabled network wherein the "beacon order" is 4, the "superframe order" is 3, and beacon interval time is approximate 0.5 second. Packet collision avoidance algorithm, CSMA.CA, is implemented on each node. "Random backoff" ranges from 1 backoff time to 8 backoff time, wherein the backoff time equals (=) 320 microseconds, which is defined in IEEE 802.15.4. The packet length is 60 bytes. Broadcasting form node A, the broadcasting suspension time is 1 second, and the default re-transmitting number of times is 3 times. In the present experiment, take the packet transmitting probability 5% and executing 5000 times for example. The results are shown in Table 1.

TABLE 1

|  | conventional manner | present invention |
| --- | --- | --- |
| broadcasting failure rate | 16.9% | 0% |
| time consumption | 2503.41 | 580.00 |
| quantity of broadcasting packets | 21.72 | 3.00 |
| quantity of regular packets/1K backoff time | 4.90 | 5.54 |
| bandwidth usage rate | 2.4% | 3.4% |

From Table 1, to compare with the conventional manner, the present invention decreases the number of broadcasting packets re-transmission, shortens the time consumption and diminishes failure rate.

According to the above descriptions, the present invention could diminish packet collisions so as to use network bandwidth effectively and shorten delay time of broadcasting packets.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication system comprising a child node and a parent node, wherein the improvement comprises:
    when a first packet is transmitted from the child node to the parent node based on an IEEE 802.15.4/ZigBee standard, the child node transmitting the first packet to the parent node by way of point-to-point transmission, and
    when a second packet is transmitted from the parent node to the child node based on the IEEE 802.15.4/ZigBee standard, the parent node transmitting a synchronization signal with a specified flag periodically for connection maintenance and synchronous control, and the child node receiving the second packet, transmitted by way of broadcasting, from the parent node in response to the synchronization signal with the specified flag set to one;
    wherein the child node sends a request signal to the parent node for re-transmitting the second packet as the child node fails to receive the second packet in a certain period after receiving the synchronization signal, and
    wherein the parent node re-transmits the second packet to the child node by way of point-to-point transmission in response to the request signal.

2. The wireless communication system as claimed in claim 1, wherein the first packet comprises a first MAC layer header, and the child node sets an object address of the first MAC layer header as a parent node address.

3. The wireless communication system as claimed in claim 1, wherein the second packet comprises a second MAC layer header, and the parent node sets an object address of the second MAC layer header as a broadcast address.

4. The wireless communication system as claimed in claim 1, wherein the child node reserves a packet receiving period for receiving the second packet after receiving the synchronization signal.

5. The wireless communication system as claimed in claim 4, wherein the packet receiving period is twice as long as a time requirement for receiving a probably longest packet.

6. A communication device for wireless communicating with a parent node and a child node, wherein:
    when a first packet is transmitted from the communication device to the parent node based on an IEEE 802.15.4/ZigBee standard, the communication device transmits the first packet to the parent node by way of point-to-point transmission, and
    when a second packet is transmitted from the communication device to the child node based on the IEEE 802.15.4/ZigBee standard, the communication device transmits a first synchronization signal with a specified flag periodically for connection maintenance and synchronous control, and transmits the second packet, in response to the synchronization signal with the specified flag set to one, to the child node after a certain period by way of broadcasting;
    wherein the communication device re-transmits the second packet by way of point-to-point transmission as the communication device receives a second request signal from the child node for re-transmitting the second packet.

7. The communication device as claimed in claim 6, wherein the first packet comprises a first MAC layer header, and the communication device sets an object address of the first MAC layer header as a parent node address.

8. The communication device as claimed in claim 6, wherein the second packet comprises a second MAC layer header, and the communication device sets an object address of the second MAC layer header as a broadcast address.

9. The communication device as claimed in claim 6, wherein the communication device reserves a packet receiving period for receiving a third packet as the communication device receives a second synchronization signal with a specified flag set to one transmitted from the parent node.

10. The communication device as claimed in claim 9, wherein the communication device sends a first request signal to the parent node for re-transmitting the third packet as the communication device fails to receive the third packet in a certain period after receiving the second synchronization signal.

11. A wireless communication method between a child node and a parent node, the method comprising the steps of:
- transmitting a first packet from the child node to the parent node by way of point-to-point transmission when the first packet needs to be transmitted to the parent node based on an IEEE 802.15.4/ZigBee standard;
- transmitting a synchronization signal with a specified flag periodically from the parent node to the child node for connection maintenance and synchronous control when a second packet needs to be transmitted to the child node based on the IEEE 802.15.4/ZigBee standard;
- receiving the second packet, transmitted by way of broadcasting, by the child node in response to the synchronization signal with the specified flag set to one;
- sending a request signal to the parent node by the child node for re-transmitting the second packet as the child node fails to receive the second packet in a certain period after receiving the synchronization signal; and
- re-transmitting the second packet to the child node by way of point-to-point transmission by the parent node in response to the request signal.

12. The method as claimed in claim 11, wherein the first packet comprises a first MAC layer header, the method further comprising the step of:
- setting an object address of the first MAC layer header as a parent node address by the child node when the first packet needs to be transmitted from the child node to the parent node.

13. The method as claimed in claim 11, wherein the second packet comprises a second MAC layer header, the method further comprising the step of
- setting an object address of the second MAC layer header as a broadcast address by the parent node when the second packet needs to be transmitted from the parent node to the child node.

14. The method as claimed in claim 11, further comprising the step of:
- reserving a packet receiving period by the child node for receiving the second packet after receiving the synchronization signal.

15. The method as claimed in claim 14, wherein the packet receiving period is twice as long as a time requirement for receiving a probably longest packet.

16. A non-transitory computer-readable medium, storing a computer program to perform a wireless communication method between a child node and a parent node based on an IEEE 802.15.4/ZigBee standard, the method comprising the steps of:
- transmitting a first packet from the child node to the parent node by way of point-to-point transmission when the first packet needs to be transmitted to the parent node based on an IEEE 802.15.4/ZigBee standard;
- transmitting a synchronization signal with a specified flag periodically from the parent node to the child node for connection maintenance and synchronous control when a second packet needs to be transmitted to the child node based on the IEEE 802.15.4/ZigBee standard;
- receiving the second packet, transmitted by way of broadcasting, by the child node in response to the synchronization signal with the specified flag set to one;
- sending a request signal to the parent node by the child node for re-transmitting the second packet as the child node fails to receive the second packet in a certain period after receiving the synchronization signal; and
- re-transmitting the second packet to the child node by way of point-to-point transmission by the parent node in response to the request signal.

17. The non-transitory computer-readable medium as claimed in claim 16, wherein the first packet comprises a first MAC layer header, the method further comprising the step of:
- setting an object address of the first MAC layer header as a parent node address by the child node when the first packet needs to be transmitted from the child node to the parent node.

18. The non-transitory computer-readable medium as claimed in claim 16, wherein the second packet comprises a second MAC layer header, the method further comprising the step of
- setting an object address of the second MAC layer header as a broadcast address by the parent node when the second packet needs to be transmitted from the parent node to the child node.

19. The non-transitory computer-readable medium as claimed in claim 16, wherein the method further comprises the step of:
- reserving a packet receiving period by the child node for receiving the second packet after receiving the synchronization signal.

20. The non-transitory computer-readable medium as claimed in claim 19, wherein the packet receiving period is twice as long as a time requirement for receiving a probably longest packet.

* * * * *